H. H. MURPHY.

INTERNAL COMBUSTION ENGINE.

APPLICATION FILED MAR. 24, 1915.

Reissued Apr. 27, 1915.

2 SHEETS—SHEET 1.

13,905.

WITNESSES:
John Buckler,
Dauphin McCormick

INVENTOR:
Howard H. Murphy
by Franklin P. Phillips, Jr.
Attorney

H. H. MURPHY.

INTERNAL COMBUSTION ENGINE.

APPLICATION FILED MAR. 24, 1915.

2 SHEETS—SHEET 2.

Reissued Apr. 27, 1915.

13,905.

WITNESSES=
John Buckler,
Ranfeth M. Cornine

INVENTOR=
Howard H. Murphy
by Franklin F. Phillips Jr.
attorney

UNITED STATES PATENT OFFICE.

HOWARD H. MURPHY, OF BOSTON, MASSACHUSETTS.

INTERNAL-COMBUSTION ENGINE.

13,905. Specification of Reissued Letters Patent. Reissued Apr. 27, 1915.

Original No. 1,096,261, dated May 12, 1914, Serial No. 700,628. Application for reissue filed March 24, 1915. Serial No. 16,792.

*To all whom it may concern:*

Be it known that I, HOWARD H. MURPHY, of Boston, in the county of Suffolk and Commonwealth of Massachusetts, have invented a new and useful Improvement in Internal-Combustion Engines, of which the following is a specification.

My invention relates particularly to the valve means controlling the inlet and exhaust ports of the engine, and it has been the special object of my invention to construct, arrange and adapt, particularly in a certain location, valves of the sliding type so that they shall be most simple and easy of operation, and shall also be combined with means adapted to effect a thorough lubrication of the valves and their actuating parts.

My invention may be best understood by reference to the accompanying drawings, in which—

Figure 1:
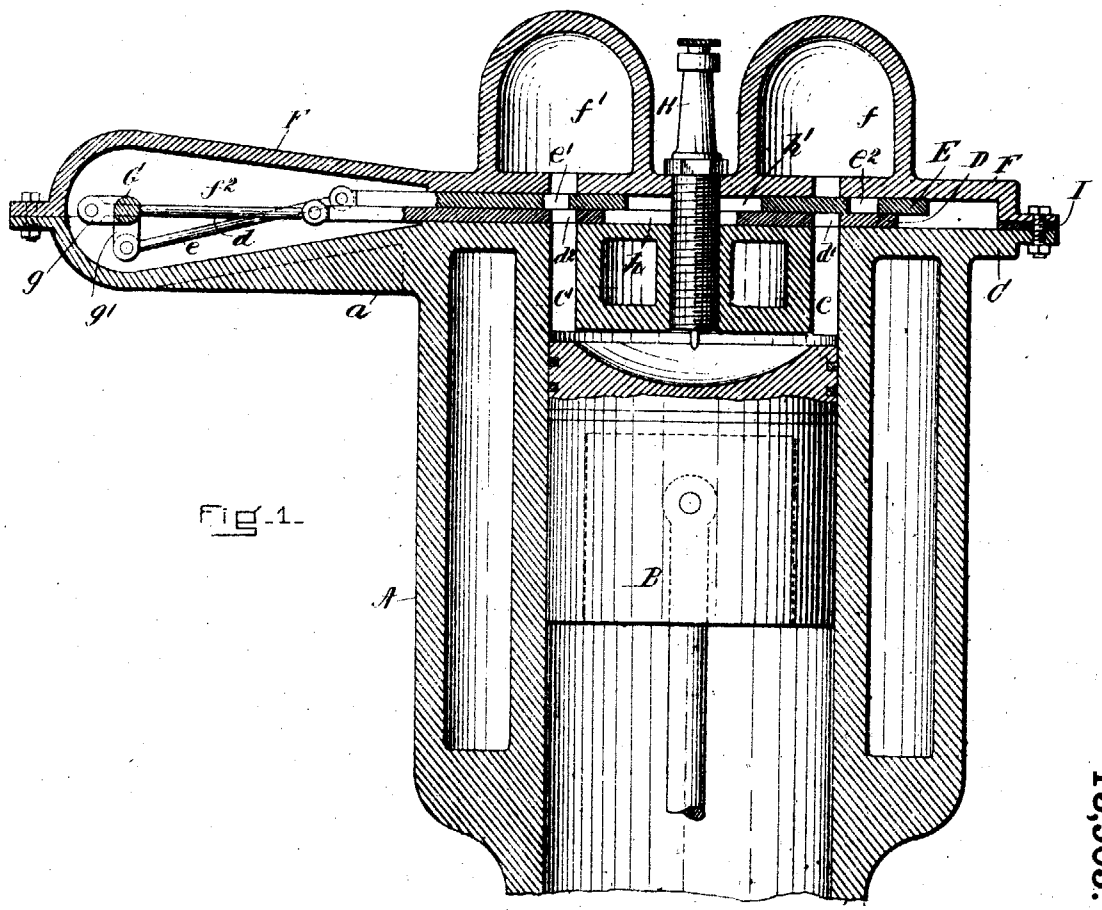
Figure 2:
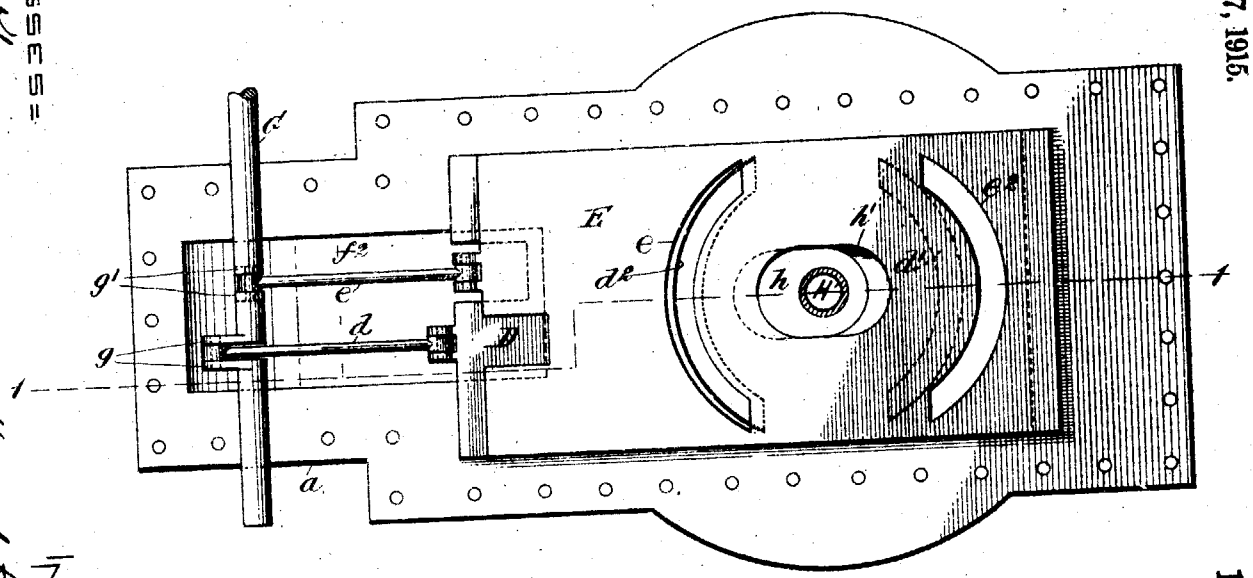

Figure 1 shows in vertical cross-section a cylinder of an internal combustion engine provided with my valve mechanism. The section is taken on dotted line 1—1 of Fig. 2. Fig. 2 is a top view of the same with the upper casing removed.

Referring now more specifically to the drawings—A indicates the cylinder of an internal combustion engine; B the piston working in it; C is the head of the cylinder, the outer face of which serves as a seat for the slide-valve D, upon which is super-imposed another slide-valve E. A casing F surmounts the whole, forming an upper bearing and containing inlet pipe $f$ and exhaust pipe $f^1$. A small strip I is bolted between the casing F and the cylinder head C opposite the ends of the slide-valves D and E, for a purpose to be hereinafter described. The cylinder A has a projection $a$, which, together with the casing F, forms a chamber $f^2$ adapted to be wholly filled with an oil bath. Within this chamber $f^2$ is mounted a rotatable shaft G, actuated by a suitable driving connection (not shown) with the main shaft of the engine, and bearing eccentric arms $g$, $g^1$, which with the connecting rods $d$ and $e$ actuate the slide-valves D and E.

H is a spark-plug threaded to fit an aperture in casing F and in the center of the cylinder head C. It passes through slots $h$, $h^1$ in the slide-valves or plates D and E, which are thus permitted free movement. The cylinder head C is provided with an intake port $c$ and an exhaust port $c^1$, extending through the casing F into the inlet and exhaust pipes $f$, $f^1$. Adapted to be brought into operative relation with these ports are the ports $d$, $d^2$ in the slide-valve D, and $e^1$ and $e^2$ in the slide-valve E.

It will be readily understood from the examination of the drawings that the slide-valves D and E each have varying rates of motion depending upon the relative position of their eccentric arms $g$, $g^1$ in respect to their planes of movement, for the movement will be fastest when the eccentric arm has a position nearest to a right angle in relation to the plane of movement of the slide-valve. It is, accordingly, apparent from the position of eccentric arm $g$ relative to eccentric arm $g^1$ that the slide-valve D is caused to move slowly when the slide-valve E is moving rapidly, and vice versa. Hence the movement of the slide-valves D and E may be so timed, and their ports $d^1$, $d^2$ and $e^1$, $e^2$ may be so arranged, that the intake port $c$ may be closed when the exhaust port $c^1$ is open and vice versa. This general method of timing slide-valves operated by eccentrics is, however, old in the art; but it will be seen that by my arrangement of sliding valve plates in the head of the cylinder a light and compact arrangement of sliding-valves may be had for the weight and friction resulting from the employment of concentric sleeves within the cylinder for the purpose of slide-valves is thus eliminated, and the power lost through the reciprocating movement of heavy parts is thus avoided. Moreover, perfect and positive lubrication is assured because the actuating means of my valve device may be inclosed in a chamber containing an oil bath into which the valve plates may project.

It has been a common fault of slide-valves in the form of concentric sleeves within the cylinder that they accumulate and pack carbon, and other products of combustion in the cylinder head thus impairing their lubrication and freedom of movement. This fault is remediable in my device by a small plate I which may be readily removed, thereby permitting a small tool to be inserted in the end of the casing F so that the carbon may be removed.

It is apparent that the arrangement and location of valves shown in my device permit the intake and exhaust ports to be placed directly over the piston and combustion chamber, thereby insuring an easy passage for the gases without change of direction. Moreover, no waste combustion space is employed in providing for inlet and exhaust passages.

Having thus fully described my invention, what I claim is—

In an internal combustion engine, the combination of a cylinder, a valve seat on the head of said cylinder, a spark-plug located in the head of said cylinder, intake and exhaust ports in said head of said cylinder, a lower sliding valve plate adapted to be moved across said valve seat, ports in said valve plate adapted to be brought into operative relation with said intake and exhaust ports, a second sliding valve plate super-imposed upon said lower valve plate, ports in said second sliding valve plate adapted to be brought in operative relation with said ports into said lower sliding valve plate, and with said intake and exhaust ports, slots in said valve plates whereby they may be permitted free movement about said spark-plug, and means whereby said sliding valve plates may be actuated in a manner whereby their movements are so timed that said intake and exhaust ports are made alternately operative.

In testimony whereof I have hereunto set my name in the presence of two subscribing witnesses.

HOWARD H. MURPHY.

Witnesses:

FRANKLIN F. PHILLIPS, Jr.,
DANFORTH W. COMINS.